United States Patent
Tannas, Jr.

(10) Patent No.: US 6,380,999 B1
(45) Date of Patent: *Apr. 30, 2002

(54) METHODS OF CUSTOMIZING THE PHYSICAL SIZE AND SHAPE OF COMMERCIAL OFF-THE-SHELF (COTS) ELECTRONIC DISPLAYS

(76) Inventor: Lawrence E. Tannas, Jr., 1426 Dana Pl., Orange, CA (US) 92866

( * ) Notice: Subject to any disclaimer, the term of this patent is extended or adjusted under 35 U.S.C. 154(b) by 0 days.

This patent is subject to a terminal disclaimer.

(21) Appl. No.: 09/812,370

(22) Filed: Mar. 16, 2001

Related U.S. Application Data

(63) Continuation of application No. 09/274,427, filed on Mar. 22, 1999, now Pat. No. 6,204,906.

(51) Int. Cl.[7] .................................................. G02F 1/1339
(52) U.S. Cl. ........................................ 349/153; 349/190
(58) Field of Search .............................. 349/187, 158, 349/153, 190

(56) References Cited

U.S. PATENT DOCUMENTS

| | | | |
|---|---|---|---|
| 4,275,494 A | | 6/1981 | Kohyama et al. |
| 5,278,685 A | | 1/1994 | Iwamoto et al. |
| 5,610,742 A | | 3/1997 | Hinata et al. |
| 5,757,456 A | * | 5/1998 | Yamazaki et al. ........... 349/187 |
| 5,808,719 A | | 9/1998 | Fujiwara et al. |
| 5,812,226 A | | 9/1998 | Izumi et al. |
| 5,929,961 A | * | 7/1999 | Nishi et al. .................. 349/187 |
| 6,191,840 B1 | * | 2/2001 | Bon ............................. 349/187 |

FOREIGN PATENT DOCUMENTS

| | | |
|---|---|---|
| EP | 0 556 855 A1 | 8/1993 |
| GB | 2 183 073 | 5/1987 |
| GB | 2 330 423 A | 4/1999 |

(List continued on next page.)

OTHER PUBLICATIONS

David Watson, et al., "Improvements in or Relating to Liquid Crystal Displays", PCT Publication WO 99/19765, Apr. 22, 1999 and the corresponding International Search Report.

*Primary Examiner*—Toan Ton
(74) *Attorney, Agent, or Firm*—Lyon & Lyon LLP

(57) ABSTRACT

Electronic displays are physically reshaped and/or resized to meet custom specifications for special applications such as avionics, where Commercial Off-The-Shelf (COTS) Liquid Crystal Displays (LCDs) are not typically used. Customization includes cutting the physical display to specified dimensions to fit into a target opening, and resealing the display to preserve proper cell spacing and assure basic functionality. The target opening is typically a control panel or dashboard opening, such as in the cockpit of an airplane. The sealing process may include improving the original seal, and/or providing additional seals. Additional seals may protect sensitive areas against chemical corrosives or contamination, humidity, electrostatic damage, etc., and/or prevent light from passing around the edge of the display image area. Electric continuity may need to be reestablished for electric leads affected during the customization process, and electronic drivers may need to be reattached to the display. Additional modifications and/or enhancements may be made to the display during reshaping and/or resizing. For example, TABs or COGs may be relocated, added, removed, replaced, and/or reoriented; electric circuits may be replaced and/or supplemented with circuits having different functionality; the display medium may be altered and/or replaced; polarizers, filters, and/or films may be added, removed, and/or replaced. The customized display may then be ruggedized by attaching a suitable bezel (face plate) and frame (support hardware) thereto, and the completed, customized display unit may then be installed in the target location and integrated with surrounding hardware and electronics.

7 Claims, 4 Drawing Sheets

FOREIGN PATENT DOCUMENTS

| | | |
|---|---|---|
| JP | 55-84918 | 6/1980 |
| JP | 57-99615 | 6/1982 |
| JP | 60-146228 | 8/1985 |
| JP | 61-186941 | 8/1986 |
| JP | 61-210326 | 9/1986 |
| JP | 61-251524 | 9/1986 |
| JP | 2-235026 | 9/1990 |
| JP | 3-293633 | 12/1991 |
| JP | 08076074 | 3/1996 |
| JP | 08122769 | 5/1996 |
| JP | 08146444 | 6/1996 |

* cited by examiner

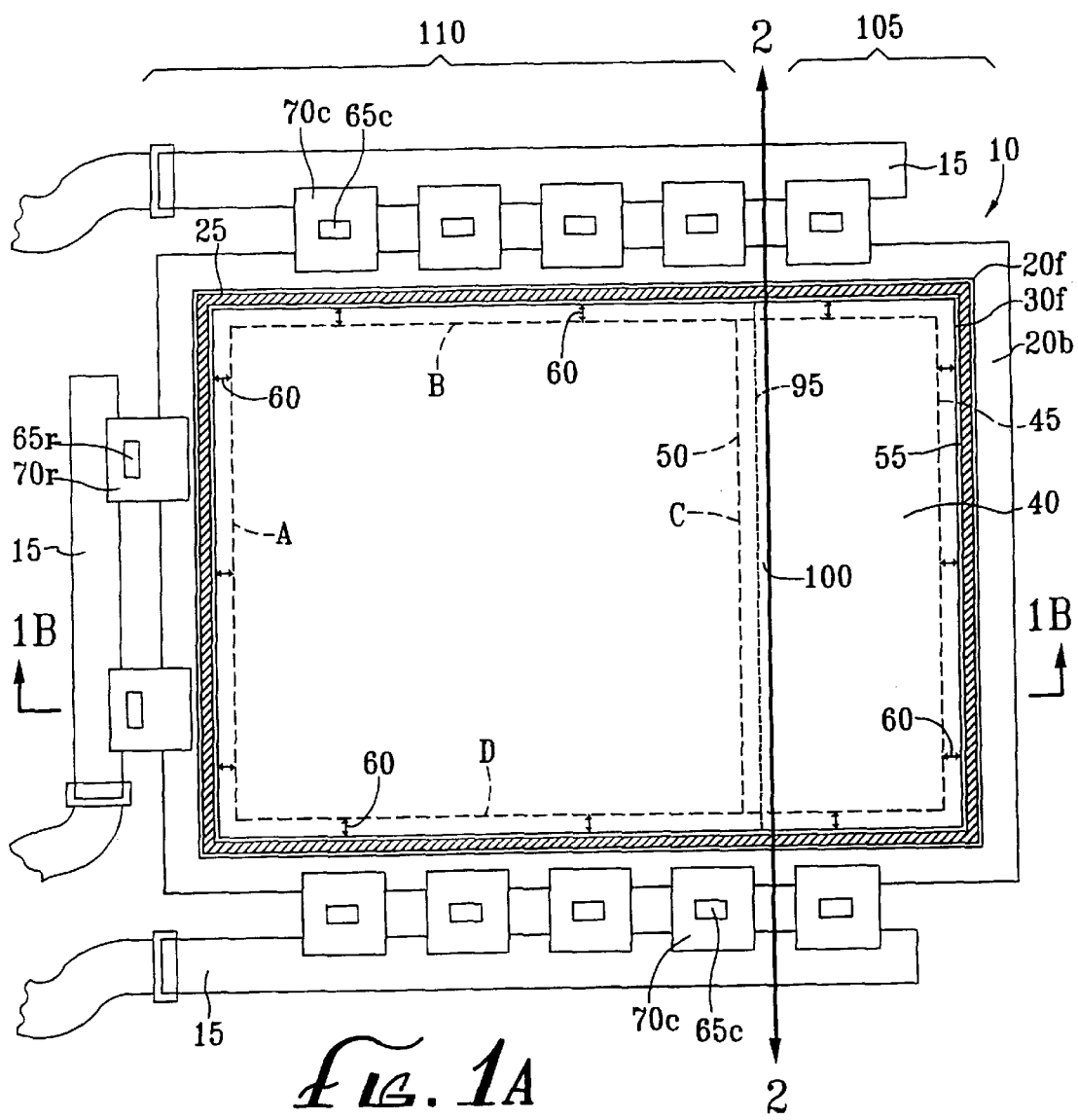
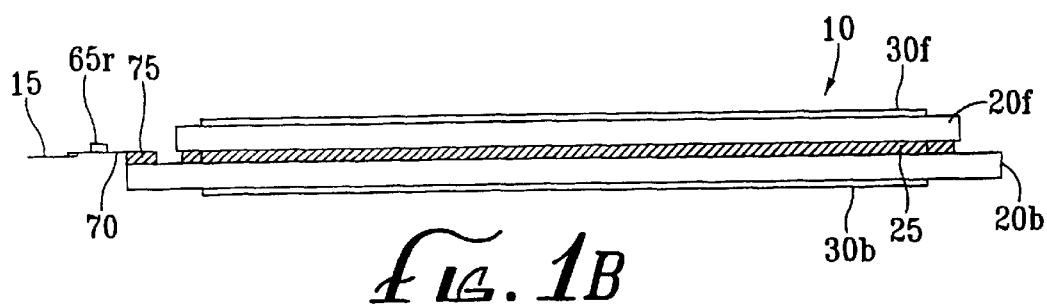

METHODS OF CUSTOMIZING THE PHYSICAL SIZE AND SHAPE OF COMMERCIAL OFF-THE-SHELF (COTS) ELECTRONIC DISPLAYS

This application is a Continuation of co-pending application Ser. No. 09/274,427, filed Mar. 22, 1999, which will issue U.S. Pat. No. 6,204,906 on Mar. 20, 2001.

FIELD OF THE INVENTION

The present invention relates generally to electronic displays, and more particularly to the customization of an original display by physical alteration of the size and/or shape thereof, such that the customized display may be used in installations not considered achievable with the original display.

DEFINITIONS

In this application, COTS is used as an acronym for "Commercial Off-The-Shelf"; FPD is used as an acronym for "Flat-Panel Display"; LCD is used as an acronym for "Liquid Crystal Display"; PDLC is used as an acronym for "Tolymer-Dispersed Liquid Crystal", AMLCD is used as an acronym for "Active Matrix Liquid Crystal Display"; TAB is used as an acronym for "Tape-Automated-Bonding"; COG is used as an acronym for "Chip-On-Glass"; UV is used as an acronym for "ultraviolet", VLSI is used as an acronym for "Very Large Scale Integration", and HDTV is used as an acronym for "High-Definition Television". All of these terms are well-known in the art.

BACKGROUND

Electronic displays are commonly used to portray data in the forms of visual text and/or other images, so the data may be interpreted and/or acted upon. Typically, the operator of equipment associated with the display will control the equipment based in part on the interpretation of the data displayed. A simple example is an airplane pilot who views a control panel display representing surrounding air traffic, and who then controls the airplane to avoid the traffic.

The displays and their associated bezels (face plates) and frames (interfacing and supporting hardware) are typically built to demanding specifications for durability, reliability, and operating life, due to industry requirements, and the resulting displays have relatively complex electrical, chemical, optical, and physical characteristics. Each particular application, for example, may require specific performance characteristics from the display, such as the ability to accommodate or withstand varying conditions of temperature, humidity, radiation, ambient light, shock, vibration, impact, chemicals, salt spray, water and fluid condensation, immersion, or other environmental, electrical, physical, and/or other conditions. Due to the high costs associated with such varying and demanding specifications, for any particular application it is thus economically necessary for manufacturers to produce a common design in high production volume, resulting in COTS displays all having substantially the same characteristics for a variety of physical sizes. The sizes vary, but the shapes are generally rectangular until and shapes. The sizes vary, but the shapes are generally rectangular with an aspect ratio of approximately three to four. Common television and computer displays typically have an aspect ratio of approximately three to four, and are typically square. HDTV displays typically have an aspect ratio of nine to sixteen.

For specialized applications where the market may not be large enough for COTS manufacturers to enter, buyers of displays are required to have displays custom-built to fit their size and shape requirements, at a cost up to ten times greater than the cost of a COTS display having identical functionality. Alternatively, buyers may choose to incorporate a COTS display into an existing control panel or dashboard opening by physically altering the size and/or shape of the control panel opening to match the size and/or shape of the COTS display. For most applications, however, such modifications cannot be made without disturbing the surrounding instruments, controls, and displays already incorporated into the control panel. Such is the case, for example, on an airplane control panel or other vehicle control panel where large numbers of instruments and controls are tightly and efficiently packed into a relatively small area to begin with. And even if the appropriate modifications could be made, they are typically cost-prohibitive.

To overcome the above-referenced drawbacks in the prior art, it would thus be desirable to provide systems and methods for customizing a COTS display to meet the size and shape requirements of a target control panel opening, such that the purchaser of the COTS display may avoid paying the extra costs associated with having a display custom-built from scratch. Such systems and methods would be advantageous for displays that have relatively high tooling costs and relatively low volume production associated therewith.

A particular industry where high-cost custom-built displays are used is the avionics industry, which traditionally used square panel openings to house mechanical control devices. To retrofit airplane control panels with electronic displays, the industry began manufacturing square displays, at a relatively high cost and relatively low volume compared to the COTS non-square displays which are commercially used in a wide variety of applications. In fact, the control panels in newly-built airplanes designed to use electronic displays, are still often made with square panel openings, despite the COTS displays being non-square, in order to maintain the well-established and familiar control panel configurations.

Since a completed electronic display is delicate and relatively complex, most experts in the filed would not expect that customization of the displays as desired could be accomplished by physically cutting an original display, changing its size and/or shape, and resealing it, while maintaining its same basic functionality. For example, most experts would not expect that a display designed to be a four-inch by six-inch display with 480 rows by 640 columns of picture elements (pixels) could be cut down to the size of a four-inch by four-inch display with 480 rows by 480 columns, and still operate successfully.

SUMMARY OF THE INVENTION

Typically, a COTS display comprises two plates, front and back, holding drive electronics on the edges. The plates are typically glass or plastic, and may have polarizers, filters, image enhancement films, and/or viewing angle enhancement films attached thereto. Row and column orthogonal electric leads distributed throughout an image-generating medium are contained between the plates, and a perimeter seal holds the plates together while isolating and protecting the image-generating medium from the outside environment. The row and column electric leads transcend the seal to external leads to which electronic drivers are attached. The electronic drivers are typically VLSI circuits bonded to TAB substrates attached to the display, or directly attached to the display as COG. In some instances the VLSI electronic drivers are made in-situ with the display picture elements.

The present invention involves systems and methods for customizing a COTS display by modifying the physical size and/or shape of the COTS display to meet the requirements of a target application. This is accomplished by cutting the physical COTS display to reduce its physical size and/or shape, and then resealing the display to achieve the desired performance. The basic functionality of the COTS display remains intact. That is, the customized display will have a new size and/or shape, and may have altered electronic drivers, image-generating media, rearranged electronics, additional seals, additional films, etc., and may actually have enhanced functionality. However, the customized display will be able to operate in a target application designed to interface with a display of the same type (e.g., AMLCD) as the original (e.g., COTS) display.

When the plates are cut, internal electronics might also be cut, often requiring reestablishment of electrical continuity. Similarly, the display electronics may be removed, reattached, or otherwise modified, and filters, polarizers, and/or other films associated with the display and typically attached externally to the plates may be cut, to conform to the customized display size and/or shape. Thus the opportunity exists to add enhanced functionality to the display. A custom bezel and frame may then be used to house the display, allowing for additional ruggedization of the entire unit.

To reseal the display, an adhesive is applied along at least the cut edge or edges. A second seal may be added to minimize the penetration of humidity and other contaminants into the display media (e.g., liquid crystal material) inside the display cell. A third seal serving as a mask may also be applied to prevent back light typically used with LCDs from passing through the display around the outer edges of the display image area.

Electronic drivers, typically VLSI circuits (bonded to TAB substrates attached to the display, or attached directly to the display as COG) may be added, repositioned and/or reattached as needed, and the circuitry on the display plates may be altered to make electrical connection to the new VLSI circuits. Filters, films, polarizers, etc., may then be cut and/or installed as desired, and additional components such as heaters, optical elements, infrared filters, touch panels, transducers, etc., may be added to alter and/or enhance durability or functionality of the display.

Finally, the reshaped and/or resized, and/or otherwise altered display is placed in a custom bezel and frame with appropriate ruggedization characteristics. The bezel and frame are designed to accommodate the newly sized and/or shaped display in a suitable manner, and to allow for proper mechanical and electrical attachment to the target location, such as an avionics box or display panel. The bezel and frame also are configured for installation such that appropriate lighting, optical elements, transducers, heaters, infrared filters, touch panels, etc., associated with the target application operate properly. The frame thus protects the display and interfaces the display with the target location, such as an avionics box or display panel. Suitable adhesives, sealants, conformal coatings, potting compounds, electrical and thermal conductors, screws, clamps, rivets, connectors, gaskets, etc., may be used as necessary or desired to further ruggedize the unit and install it into its target location. Ruggedization may be required, for example, before installing the customized unit into environments of vehicles, ships, submersibles, missiles, aircraft, spacecraft, portable equipment, etc., which tend to be more restrictive and severe than the environments for which COTS displays are designed. Similarly, simulators for situations such as those described above may also require ruggedization of the customized unit.

One aspect of the present invention thus involves customizing an electronic display by cutting the display along desired dimensions resulting in a target display portion and an excess display portion, and applying a first seal between the plates along an exposed edge of the target display portion, said first seal creating a barrier to prevent the image-generating medium from escaping out of the area between the plates, wherein the basic functionality of the display remains intact. A second seal and/or a third seal may be added.

Another aspect involves customizing an electronic display by cutting the display along desired dimensions resulting in a target display portion and an excess display portion, applying a first seal along an exposed edge of the target display portion between the plates, applying a second seal over the first seal, and applying a third seal over the second seal, wherein the basic functionality of the display remains intact.

Another aspect of the present invention involves creating a customized electronic display comprising a substantially flat front plate having an upper surface and a lower surface, a substantially flat back plate having an upper surface and a lower surface, said back plate positioned behind said front plate and substantially parallel thereto, a perimeter seal positioned between said plates and forming an enclosed cell area defined by the lower surface of the front plate, the upper surface of the back plate, and the perimeter seal, an image-generating medium contained within said cell area, electrical conductors distributed throughout said image-generating medium, a substantially flat first polarizer attached to the upper surface of said front plate, said first polarizer having a perimeter, a second seal positioned over the perimeter seal, and a first silicone bead positioned over the perimeter of the first polarizer. A third seal may be added.

Systems and methods are thus described for customizing an original (e.g. COTS AMLCD) display to meet the size and/or shape requirements of a target location. Other objects and advantages of the present invention will be apparent from the detailed description which follows, when read in conjunction with the associated drawings.

BRIEF DESCRIPTION OF THE DRAWINGS

FIG. 1A is a plan view of a typical COTS AMLCD.

FIG. 1B is a cross-sectional view of FIG. 1A, along line 1B—1B, with the column TABs removed from the cross-section for purposes of clarity.

DETAILED DESCRIPTION OF THE INVENTION

Figure 2A:
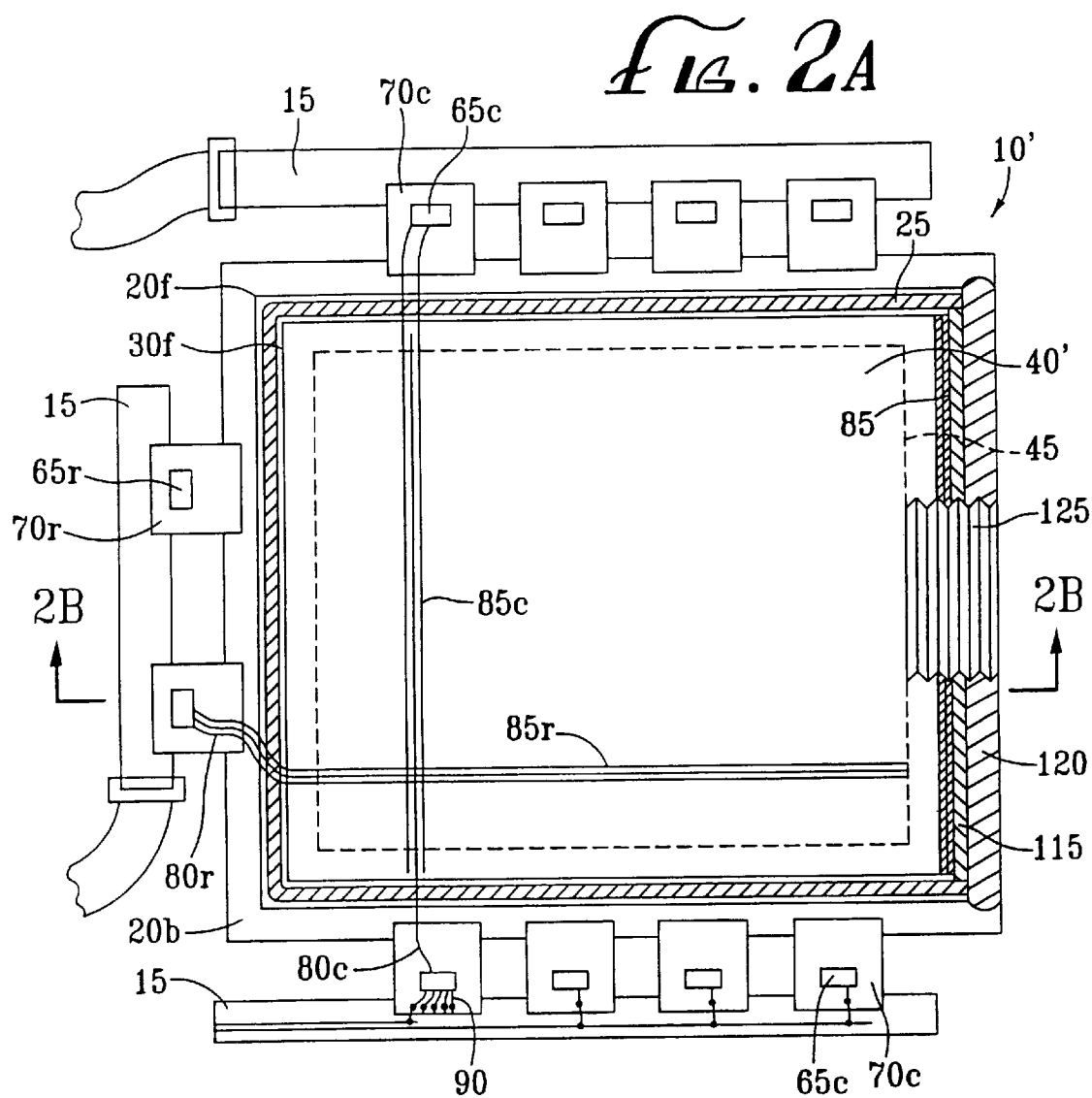
FIG. 2A is a plan view of a customized display made from the COTS AMLCD shown in FIG 1A, by cutting along line 2—2 in FIG. 1, and then resealing.

FIGS. 1A and 1B show a typical rectangular, non-square COTS AMLCD 10, before resizing and/or reshaping, but after disassembly from its original bezel, frame, and other associated hardware and electronics. The external components associated with the display 10 other than the circuit boards 15 and the components bonded or attached to the display plates 20f and 20b, have been removed for clarity. Such external components would preferably be removed prior to performing the customization of the display 10 as described herein.

The display 10 comprises a front plate 20f and a back plate 20b, each preferably made of glass or plastic. The plates 20 are held together by a perimeter seal 25 such as a UV curing urethane as is known in the art, and are also typically further secured within a bezel (not shown) which is in turn secured to a frame or other hardware (not shown) for attachment to the target location. Polarizing films 30f and 30b, filters (not shown), image enhancement films (not shown), retardation films (not shown), viewing angle enhancement films (not shown), and/or other films may exist on the front and/or back outer surfaces of the plates 20. The original display image area 40 defined by the manufacturer of the COTS AMLCD is indicated by dashed perimeter line 45. (Dashed line 50 represents the desired right edge of the display image area 40 after customization, as will be described shortly). A light-blocking mask (not shown) is typically placed between plates 20 and covers a perimeter area form the outer edge of the display image area 40, and extending outwardly to a sufficient distance to serve its purpose. Typically, the distance will be up to the edge of the bezel, or to the inner edge 55 of perimeter seal 25 as indicated by arrows 60 in FIG. 1A. Without the mask, light escaping around the edge of the display image area 40 might cause distraction to a person viewing the display 10.

Row and column electronic drivers 65r and 65c respectively are bonded to TAB substrates 70r and 70c respectively, which in turn are bonded to the edges of the plates 20 using electrically-anisotropic adhesives 75 as is known in the art. In avionics, bent TABs (not shown) are often used to save panel area. In addition or alternatively, the drivers 65 may be attached directly to the plates 20 as COGs. The electronic drivers 65 are preferably at least VLSI circuits, having corresponding external leads 80r, 80c electrically connected through perimeter seal 25 to the row and column electric leads 85r, 85c respectively (see FIG. 2A). For simplicity, only a few leads 80 from only one row TAB 70r and two column TABs 70c are shown in FIG. 2A, but it is to be understood that each row TAB 70r and each column TAB 70c may have dozens or even hundreds of individual leads 80 as is known in the art. The row and column electric leads 85 are distributed throughout an image-generating medium such as liquid crystal material (normally transparent) contained between the plates 20, as seen in FIG. 2A. The perimeter seal 25, in addition to holding the plates 20 together, isolates and protects the image-generating medium from the outside environment. The TABs 70 are bonded or soldered to circuit boards 15, and are electrically connected to external sources via connections 90 to circuit boards 15, and as is well known in the art. COGs (not shown) may be electrically connected to the edges of the display plates 20 which are connected electrically via ribbon cables to external sources, as is known in the art. Again, for simplicity only a few connections 90 are shown in FIG. 2A, but it is to be understood that they may be provided as desired or needed.

Figure 2B:
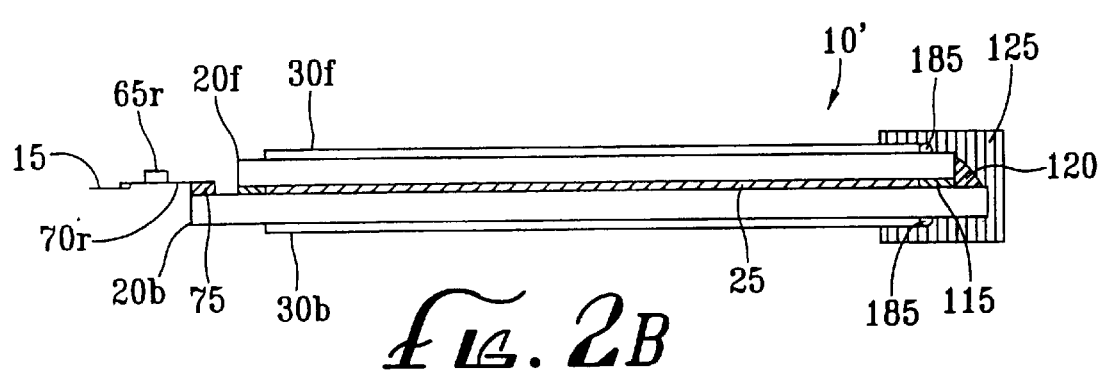
FIG. 2B is a cross-sectional view, along line 2B—2B, of the customized display shown in FIG. 2A, with the column TABs removed from the cross-section for purposes of clarity.

To customize the COTS AMLCD 10 of FIG. 1A, an example will be described wherein the display 10 (and circuit boards 15) are cut along line 2—2 in FIG. 1 to reshape the display 10 to fit into a square target panel opening, such as that of an airplane control panel. The resulting customized display 10' is shown in FIGS. 2A and 2B. The customization of a COTS display 10 may be done in varying degrees, as necessary or desired, and the examples provided herein are not to be viewed as setting forth required techniques unless specifically so stated.

The COTS display 10 is preferably first mounted into a fixture (not shown) to stabilize the display 10 in preparation for cutting. The fixture may also be used to maintain cell thickness (the distance between the plates 20) and desired dimensions. Part or all of the fixture may be the VPI FAST-24 model glass-cutting machine made by Villa Precision International, Phoenix Ariz.

The display 10 is then cut to its desired shape along the desired dimensions, which in our example is a square. The cut or cuts may be performed in a single step, by laser cutting, sawing, grinding, etc., or in multiple steps wherein the first step is a tracing or preparatory step. For example, the desired dimensions might first be scribed, etched, traced, etc., and the display 10 may then be broken along the scribe dimensions. Any method sufficient to ensure a substantially smooth cut is acceptable. Scribing with a precision glass-cutting machine with vacuum-holding and optical alignment capability has been shown to be sufficient. AMLCDs are typically made with a borosilicate hard glass and approximately 60 pounds of pressure has been shown to be sufficient for scribing the glass. The scribe wheel is preferably made of diamond or is of a hard carbide type. A small wheel (e.g., 1 mm to 4 mm in diameter) with a sharp angle (e.g., approximately 100 degrees) has been shown to be sufficient, at a nominal cutting speed. Each plate 20 should be scribed separately. The optical alignment feature of the machine is helpful to ensure that the corresponding scribe lines on opposing plates 20f and 20b are coincident or displaced as desired. Alignment marks placed on COTS displays by manufacturers may be used for alignment in the glass-cutting machine.

Circuit boards 15 may also be cut by techniques known in the art, as indicated by cut-line 2—2, as can TABs 70. However, if a dimension line calls for cutting through an electronic driver 65, the driver may need to be relocated and/or replaced. If polarizers 30 or other films are present, it is possible to cut them simultaneously while cutting the plates 20, but it is preferable that they are scored first to create a target polarizer portion for further use in the customization process, and an excess polarizer portion that may be discarded. The excess polarizer portions are then removed prior to cutting the plates 20. Doing so allows unobstructed access to the plates 20 for cutting the plates 20. After scoring the films, simple peeling away of the unwanted portions has been shown to be sufficient.

Thus, the specific dimensions of the score lines to remove the films should be selected to substantially correspond to the target cutting dimensions, but be offset radially inward a slight amount. The goal is to allow the original films to remain intact over the target display image area 40' while still providing unobstructed access to the plates 20 for cutting the plates 20. For example, in FIG. 1A, the target display image area 40' is defined by the square A-B-C-D, and the target cutting line for the plates 20 is shown as line 2—2. The target score line for the polarizers 30 and other films present might be line 95. After scoring, all portions of the films to the right of line 95 will be peeled away. Similar procedures would be used for each display plate 20f, 20b. That will leave sufficient leeway 100 between the target cutting line 2—2 for the plates 20, and the newly-exposed edge (defined by line 95) of the polarizers 30 and films. Additionally, the remaining portions of the original polarizers 30 and films will still cover the target display image area 40'.

Immediately, or soon after the display 10 is cut (either by direct cutting or by scribing and breaking, for example), the display 10 is oriented to prevent the liquid crystal material or other image-generating medium from escaping due to any newly-exposed unsealed edges. Precision glass-breaking machines are available from Villa Precision International, Phoenix Ariz. Manual breaking, after scribing, by one skilled in the art, merely using hands and fingers, has been found to be sufficient. After breaking, a simple manual re-orientation of the display 10' has been shown to be sufficiently timely. Typically, the image-generating medium is not viscous enough to escape. The excess display portion (105 in FIG. 1A), may be discarded, while the target display portion (110 in FIG. 1A) is retained for further customization.

The newly-exposed plate edges are then cleaned and wiped dry of any excess liquid crystal material using, for example, a dry cotton swab. Care should be taken to not use fluids, as fluids might contaminate the liquid crystal material. Liquid crystal material is then drained or wicked out of the cell to allow for a replacement seal line 115 to be placed along the then newly-exposed and newly-unsealed plate edges. The replacement seal 115 is installed by applying an adhesive along the cut edge and preferably in between the plates 20 to reseal the display 10'. The adhesive is preferably chosen to have proper mechanical properties to preserve the cell spacing. For example, precision micro-spheres may be mixed into the adhesive to ensure spacing. The adhesive should also have a proper viscosity to allow it to flow inwardly sufficiently to fill any void in the cell between the plates 20 and the liquid crystal material. Low-viscosity UV curing urethane of the methacrylate family have been shown to have the desired characteristics. A wetting and/or thinning agent may be used as needed. In addition, these urethanes interface with the liquid crystal material without adverse effects, as is well-known in the field of PDLCs. Curing time of approximately five minutes has been shown to be sufficient.

The adhesive and display 10' may need to be outgased to remove any trapped gases and voids, as the adhesive is being cured. Both the outgassing and the curing may be accomplished by techniques well-known in the art. After curing, a second seal 120 is preferably added, then outgased and cured as necessary. A UV curing lamp(s) and/or heater(s) may be mounted in a vacuum chamber for ease in outgassing and curing. The second seal 120 is preferably silicone, and is applied to minimize the penetration of humidity and contaminants into the liquid crystal material inside the cell. The silicone seal 120 is preferably thermally set, as is known in the art. The silicone seal 120 may have black ink, dye, or pigment added thereto to produce a substantially black-colored silicone, and may be applied up to the outer perimeter of the target display image area 40', to prevent back light from passing through the display 10' around the outer edges of the target display image area 40'.

Alternatively, an optional mask or third seal 125 may be added to the newly-exposed plate edges over the silicone seal 120, and applied up to the outer perimeter of the target display image area 40'. The mask 125 is shown partially broken away in FIG. 2A. It should be dark (preferably black), and may be tape, ink, sealant, adhesive, plastic, or any other suitable material. At least one of the dark silicone seal 120, or the optional mask 125, are preferred, to replace any of the original mask (not shown) removed during the customization process. Additionally, the mask 125 may be placed around the entire perimeter of the cell, substantially overlaying the original perimeter seal 25 and original mask.

If internal electronics 85 are cut, electrical continuity may need to be reestablished as will be described shortly. Similarly, new VLSI circuits 65 may be needed, or the dimension lines may intersect a TAB 70 or COG location (see FIG. 3 for example), and therefore the TABs 70 or COGs would be removed and reattached with the same or new VLSI circuits 65 by techniques used in the industry for repairing displays. The configuration of the TABs 70 and/or COGs may be changed to accommodate size and packaging requirements. The circuitry on the display plates 20 may be altered to make electrical connection to the new VLSI circuits. The COG circuits may be changed to TABs 70, and vice versa. The TAB substrate 70 itself may be changed to bent tabs, for example, to accommodate new packaging requirements.

If it is desired to replace the liquid crystal material, the material may be extracted and replaced with another image-generating medium, to enhance or alter performance. If the extraction is to be done first, then only a single break in the seal 25 is needed to drain or suck out the original material. However, two breaks in the seal 25 may be used—one to apply pressure and the other to apply suction for extraction of the material. With two breaks, the new image-generating medium may be pumped or fed into the pressure end concurrently with the suction on the other end, thus allowing the new image-generating medium to displace the old material in a single process. Other techniques are known in the industry for refilling the cell.

Thus, additional modifications and/or enhancements that may be made to the display during reshaping and/or resizing include relocating, adding, and/or removing, TABs 70 or COGs; replacing electric circuits and/or supplementing with circuits having different functionality; altering and/or replacing the display medium; and/or adding, removing, and/or replacing polarizers, filters, and/or films.

Figure 3:
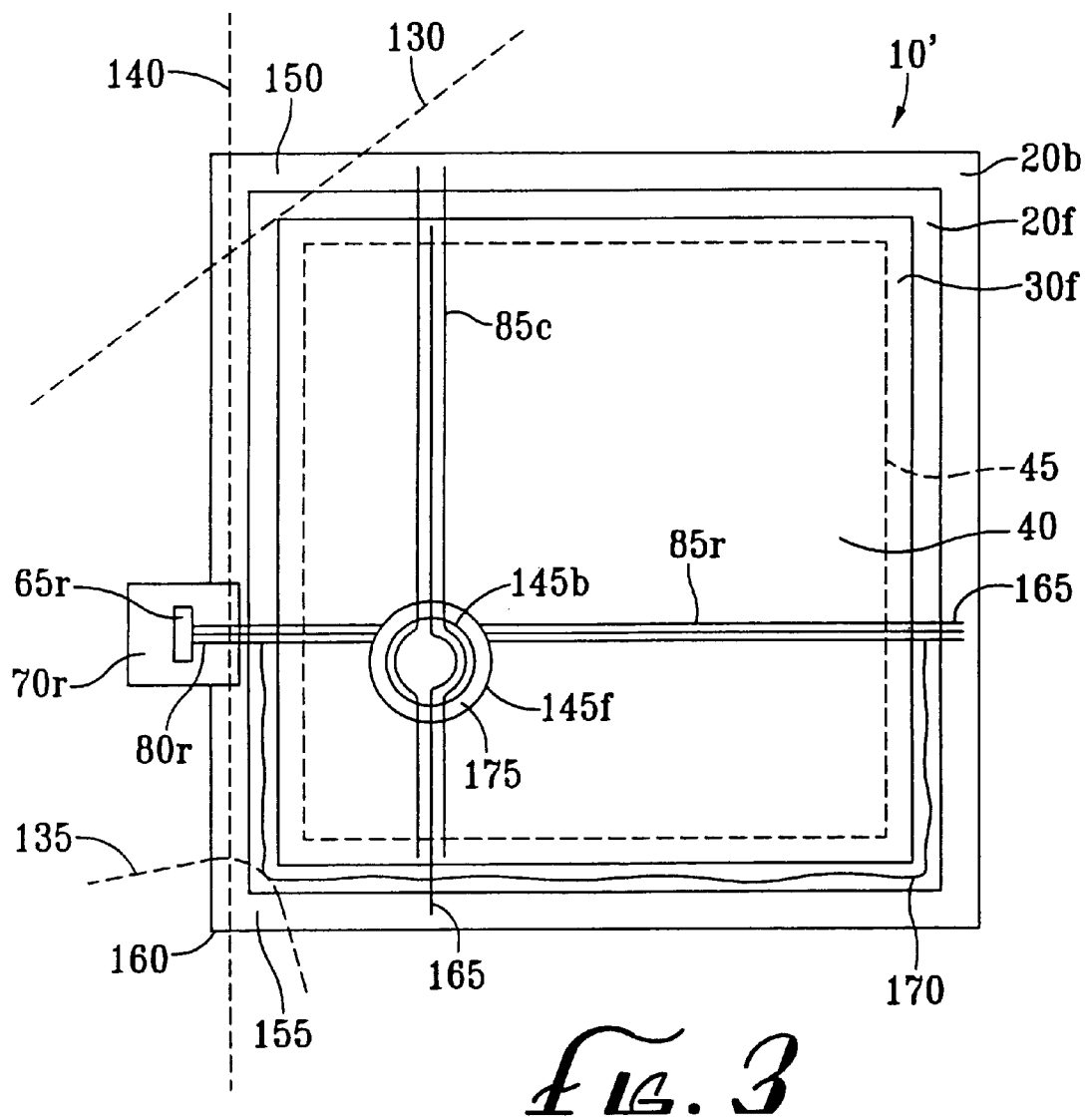
FIG. 3 is a plan view of a customized display, showing additional special cuts that might be required as part of the customization.

Turning now to FIG. 3, a display 10' with additional special cuts 130, 135, and 140, for a custom avionics application is shown. In this example, the corners 150 and 155 are to be removed to allow for the protrusion of screws and other mechanical and electrical objects from the target control panel, and one edge 160 is to be trimmed as indicated by cut-line 140. Additionally, circular cuts 145f and 145b are required for protrusion of a shaft or other object such as a mechanical indicator. The circuit boards 15, seals 25, and most of the TABs 70 have been removed for clarity of the drawing. In this example, one of the dimension lines 140 requires a cut through the present location of a TAB 70, such that the TAB 70 may need to be removed and reattached, either before or after cutting.

The row and/or column leads (85r and 85c respectively) are exposed at points 165 by a staggered cut of the plates 20, and may be cleaned and prepared as is known in the art, prior to being connected to a TAB 70 or COG. The techniques previously described may be used for the special cuts 130, 135, 140, and 145. However, as exemplified by the circular cuts 145, this example shows a situation wherein the electrical continuity of the row and/or column leads (85r and 85c respectively) will need to be reestablished.

The proper electrical connections may be reestablished using a jumper wire which reconnects the broken leads by traversing a path outside of the display image area 40'. For example, one such path is along the exposed portion of a plate 20 from one end of the plate 20 to the other (see 170 in FIG. 3). Another such path may be through the circular cutouts (see 145 in FIG. 3), where there may be an exposed surface portion 175 on the back plate 20b due to staggered cutting (e.g., the circular cutout 145f on the front plate 20f may have a larger diameter than the circular cutout 145b on the back plate 20b, as seen in FIG. 3). Alternatively, the conductive paths may be mounted on or integrated within the under surface of the mechanical indicator to be placed within the circular cutouts 145. This may be accomplished using, e.g., a wire, a polyimide tape circuit with anisotropic conductive adhesive, or a circuit board with appropriate electrical connectors.

For desired dimensions such as the circular cutout, some amount of the image-generating medium may escape at virtually any orientation of the display 10' due to gravity. Keeping the plates 20 substantially flat, however, should minimize such escape, due to surface tension between the image-generating medium and the plates 20, as well as due to the low viscosity of the image-generating medium. Any escaped material, however, may be replaced using techniques described herein and/or known in the art. The exposed edges of the plates 20 due to the circular cutout areas 145 should be sealed using the techniques described herein.

Figure 4A:
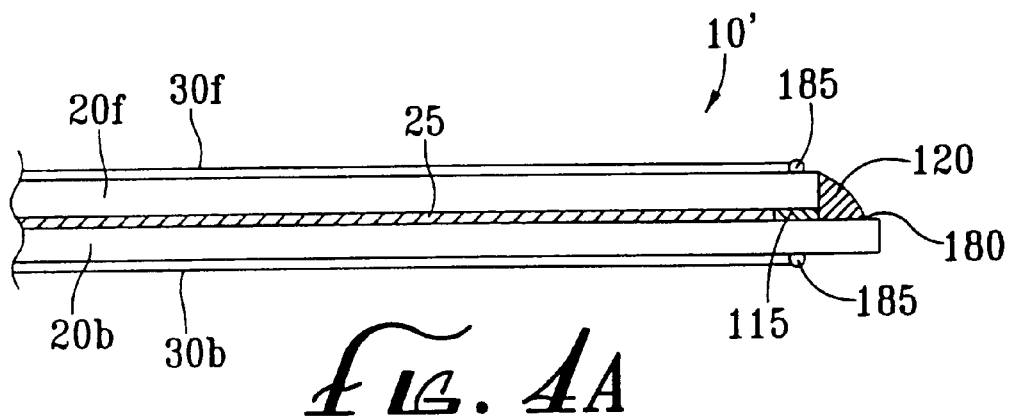
FIG. 4A is a partial cross-sectional view of a customized display having staggered cuts on the opposing plates, showing first and second seal layers.
Figure 4B:
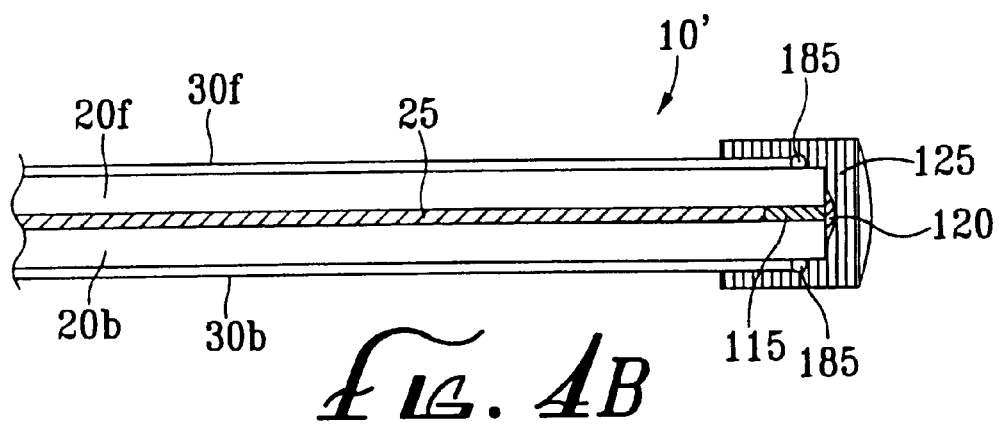
FIG. 4B is a partial cross-sectional view of a customized display having aligned cuts on the opposing plates, showing a third seal layer.
Figure 4C:
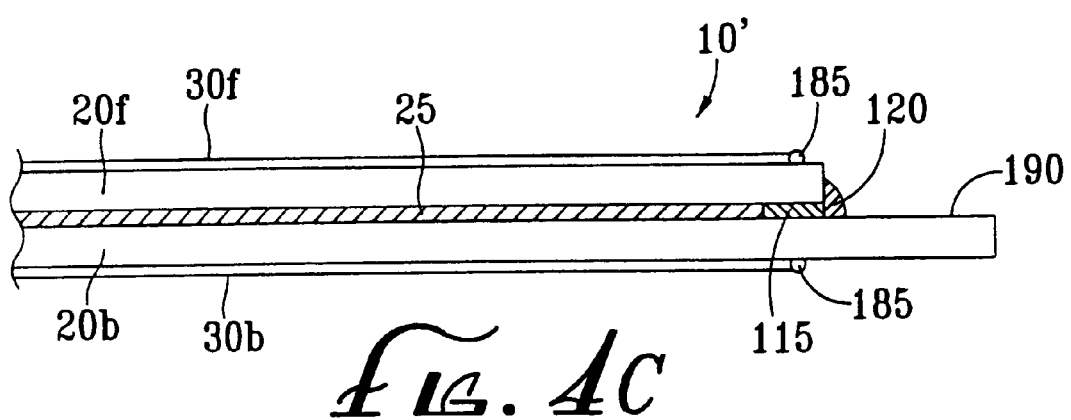
FIG. 4C is a partial cross-sectional view of a customized display having an extended lower plate for use to attach electronic drivers or jumper wires.

Turning now to FIGS. 4A, 4B, and 4C, various sealing techniques will be described in more detail. Each of these drawings shows a partial cross-section of a customized display 10', from a similar perspective as in FIGS. 1B and 2B, and like FIGS. 1B and 2B, the column TABs 70c have been removed for clarity.

The display 10' may be cut to various pre-sealing arrangements, some of which are shown in FIGS. 4A, 4B, and 4C. The staggered cut, shown in FIG. 4A, provides an extra exposed surface 180 on the back plate 20b to support the second seal 120, and the second seal 120 will generally be stronger as compared to the second seal 120 on an evenly cut set of plates 20 as shown in FIG. 4B. Though neither the second seal 120 nor the third seal (the light mask 125) are required, they are both preferred.

The first seal 115 is an adhesive and serves the purpose of barricading the image-generating medium from leaking out, as well as mechanically holding the plates 20 together at the proper spacing. By way of example, the cell gap (space between the plates 20) for AMLCDs is typically 6 micrometers with tolerances of 0.1 micrometers. Glass beads, or suitable objects, may be added to the seal material to aid in preserving the minimum cell thickness. The adhesive must be chemically compatible with the image-generating medium. The compatibility, reacting and mixing of urethanes, epoxies, and water emulsions, with liquid crystal materials, have been studied extensively in the field of PDLC displays. The UV-curing adhesives used to repair automobile glass cracks would be suitable here as the environmental conditions may be similar.

The second seal is a silicone adhesive and serves the purpose of a humidity and moisture barrier. A family of silicone encapsulants and adhesives has been developed for the electronics industry to prevent humidity and moisture from attacking electronic parts. As used with the methods described herein, the use of silicone is designed primarily to keep water molecules away from the liquid crystal material, polarizers, and display electronics. Silicones such as Sylgard brand by Dow Corning Corporation, part numbers 527 and 184, may be used. The humidity and moisture protecting properties of silicone are well-known in the electronics packaging industry.

As a further ruggedizing measure, a silicone seal or bead 185 (similar to the second seal 120) may be applied along all cut edges, or all edges, of the polarizers 30 and other films, as seen in FIGS. 4A, 4B, and 4C. For example, when submitted to avionics temperature/humidity testing, the polarizers 30 deteriorated at the edges. These seals 185 would further protect the polarizers 30 from such damage. In fact, to ruggedize a COTS display 10 for avionics use, all permeable seam lines and areas sensitive to moisture may be covered with silicone seals. In particular, the polarizer edges, the liquid crystal cell seal 25, plastic electronics packages, and any exposed conductors or metal electrodes may need to be covered. The silicone has the effect of occupying all chemically active sites and cross-linking to inhibit water molecules from accumulating in the silicone and at the silicone surface interface being protected. Additionally, silicone is used to suppress corona discharge and electrostatic detrimental effect on, around, and near conductors.

These additional silicone seals may be applied at any time during the process, but it is preferred that they are applied after the COTS display 10 is cut and the first seal 115 has been reapplied. It should be done then because silicone chemically attaches to most surfaces and is not easily removed by conventional chemicals or cleaning agents or by surface cleaning techniques. Also, once cured, the silicone is not readily bonded to by other materials. This includes the body of the silicone, as well as any surface the silicone wetted, even after removal by conventional techniques. Because of the unique properties of silicone adhesives and sealants, they should be used sparingly and appropriately by a person skilled in the art of sealants or silicone use. Conformal coatings, such as polyimide, may also be used to cover the exposed electric leads and provide additional protection thereto.

A third seal or mask 125 may also be used to prevent back light from passing through the display 10' around the outer edges of the target display image area 40'. Typically, a COTS display 10 has a black mask in the plane of the image or image-generating medium. The third seal 125 should be applied to the top and bottom of the plates 20, up to the edge of the target display image area 40' (best seen in FIG. 2A), to trap the light and prevent its escape due to parallax between the plates. Opaque layers in varying degrees of opacity may be used. Alternatively or in addition, black absorbing dyes or pigments may be included in the first seal 115 and/or second seal 120.

Other seals may be added to further enhance the sealing, ruggedization and performance of the completed display unit. For example, a thermal conductive perimeter seal may be added to conduct heat to or from the display 10'. An additional adhesive layer, such as polysulfide, may be used to bond the display glass cell to a metal frame. Conformal coatings such as polyimide may be used to ruggedize various parts.

FIG. 4C shows a cutting arrangement resulting in an extended bottom plate area 190, which may be used to attach TABs 70 or COGs or jumper wires as desired.

The basic functionality of the original display remains intact. That is, the customized display may have a new size and/or shape, and may have altered electronic drivers, image-generating medium, rearranged electronics, additional seals, additional films, etc., and may actually have enhanced functionality. However, the customized display will be able to operate in a target application designed to interface with a display of the same type as the original display. For example, a COTS AMLCD, having gone through a customization process as described herein, will be able to function in an avionics application designed to interface with an AMLCD. The customized display would respond appropriately to electrical signals designed to be input to the COTS display. Pixels on the customized display would continue to operate as they would in connection with the COTS display. The speed of response, contrast ratio, gray shades, etc., of the customized display would operate as they would in connection with the COTS display. The ultimate image (text, graphics, pictures, etc.) would thus appear appropriately on the display image area of the customized display.

While certain embodiments are illustrated in the drawings and are described herein, including preferred embodiments, it will be apparent to those skilled in the art that the specific embodiments described herein may be modified without departing from the inventive concepts described.

For example, depending upon the specific requirements for a particular application, various combinations of the customizing techniques described herein may be applied. The seals 115, 120, 125, and 185, may be applied in different combinations, different amounts or ratios, and varying sequences, depending on the application. Some of the seals may be omitted or used redundantly as the application may require.

Additionally, though the examples used herein generally referred to COTS AMLCDs as used in avionics where square displays are used, the concepts are equally applicable to other types of LCDs or other display technologies, and for other industrial applications including those requiring other customized shapes. Furthermore, though the examples used show only one set of row TABs and two sets of column TABS, in practice that may be switched, or there may be two sets of each, and the quantity of each may vary, all as is desired or needed for a specific application.

Accordingly, the invention is not to be restricted except by the claims which follow.

What is claimed is:

1. A method for changing the physical shape of an electronic display, wherein the display comprises a front plate, a back plate, and a perimeter seal spacing apart the plates, and wherein image-generating medium is sealed in an area between the plates and within the borders of the perimeter seal, the method comprising the steps of:

cutting the display along desired dimensions resulting in a target display portion and an excess display portion, thereby breaking the perimeter seal of the display; and applying a first seal along an exposed edge of the target display portion, the first seal creating a barrier to prevent the image-generating medium from escaping out of the area between the plates.

2. The method of claim 1, further comprising:

scoring a polarizer attached to an upper surface of the front plate resulting in a target polarizer portion and an excess polarizer portion; and removing the excess polarizer portion from the display before performing the cutting step.

3. The method of claim 1, wherein the display further comprises electronic circuits for operating the display, and wherein the cutting step comprises cutting at least some of the electronic circuits.

4. The method of claim 1, further comprising modifying the electronic circuits on the target display portion to retain the basic functionality of the display.

5. A method for changing the physical shape of an electronic display, wherein the display comprises a front plate, a back plate, and a perimeter seal spacing apart the plates, and wherein image-generating medium is sealed in an area between the plates and within the borders of the perimeter seal, the display further comprising electronic circuits for operating the display, the method comprising the steps:

cutting the display along desired dimensions resulting in a target display portion and an excess display portion, thereby cutting at least some of the electronic circuits; and applying a first seal along an exposed edge of the target display portion.

6. The method of claim 5, further comprising reestablishing electrical continuity for the electronic circuits that are cut.

7. The method of claim 6, wherein the reestablishing electrical continuity step comprises attaching new COGS, TABS, or VLSI circuits to the display.

* * * * *

Adverse Decision in Interference

Patent No. 6,380,999, Lawrence E. Tannas, Jr., METHODS OF CUSTOMIZING THE PHYSICAL SIZE AND SHAPE OF COMMERCIAL OFF-THE-SHELF (COTS) ELECTRONIC DISPLAYS, Interference No. 105,096, final judgment adverse to the patentee rendered December 20, 2005, as to claims 1-7.
*(Official Gazette February 19, 2008)*